(12) United States Patent
Lülfing

(10) Patent No.: US 11,492,237 B2
(45) Date of Patent: Nov. 8, 2022

(54) CONTINUOUS CABLE WINCH

(71) Applicant: DualLift GmbH, Bremen (DE)

(72) Inventor: Frank Lülfing, Wietze (DE)

(73) Assignee: DUALLIFT GMBH, Osterholz-Scharmbec (DE)

(*) Notice: Subject to any disclaimer, the term of this patent is extended or adjusted under 35 U.S.C. 154(b) by 374 days.

(21) Appl. No.: 15/780,966

(22) PCT Filed: Jun. 15, 2016

(86) PCT No.: PCT/EP2016/063747
§ 371 (c)(1),
(2) Date: Jun. 27, 2018

(87) PCT Pub. No.: WO2017/092882
PCT Pub. Date: Jun. 8, 2017

(65) Prior Publication Data
US 2018/0362307 A1 Dec. 20, 2018

(30) Foreign Application Priority Data
Dec. 4, 2015 (DE) .................. 20 2015 106 629.5

(51) Int. Cl.
*B66D 1/46* (2006.01)
*B66D 1/48* (2006.01)
*E04G 3/32* (2006.01)

(52) U.S. Cl.
CPC .............. *B66D 1/46* (2013.01); *B66D 1/485* (2013.01); *E04G 3/32* (2013.01)

(58) Field of Classification Search
CPC ....... B66D 1/46; B66D 1/485; H02M 5/4585; E04G 3/32; H02P 7/00
See application file for complete search history.

(56) References Cited

U.S. PATENT DOCUMENTS

2003/0098668 A1 5/2003 Jadric et al.
2003/0205703 A1 11/2003 McCormick et al.
(Continued)

FOREIGN PATENT DOCUMENTS

CN 204173824 U 2/2015
EP 0347408 A1 12/1989
(Continued)

OTHER PUBLICATIONS

Decision of Rejection dated Feb. 4, 2020 for Japanese Patent Application No. 2018-548274.
(Continued)

*Primary Examiner* — Sang K Kim
*Assistant Examiner* — Nathaniel L Adams
(74) *Attorney, Agent, or Firm* — BakerHostetler

(57) ABSTRACT

The invention relates to a continuous cable winch comprising a drive unit (20) and an output unit (60) for applying a drive force to a cable, which output unit is coupled to the drive unit (20).
According to the invention, it is proposed that the drive unit (20) has a frequency converter (30) with a primary side (32) for drawing current from a power supply system (33) and a secondary side (36) for outputting an AC voltage ($U_U$, $U_V$, $U_W$), an AC motor (40) for driving the continuous cable winch (10) at a variable rotation speed ($\omega_1$), which AC motor is supplied with the AC voltage ($U_U$, $U_V$, $U_W$) by the frequency converter (30), a control unit (50) which is interconnected with the frequency converter (30) and the AC motor (40) for the purpose of controlling the drive unit (20), wherein the control unit (50) is designed to change the rotation speed ($\omega_1$) of the AC motor (40) by means of the frequency converter (30).

14 Claims, 4 Drawing Sheets

(56) References Cited

U.S. PATENT DOCUMENTS

2013/0015021 A1    1/2013   Stolt et al.
2015/0090946 A1    4/2015   Schwaiger

FOREIGN PATENT DOCUMENTS

| EP | 0710619 A2 | 5/1996 |
|---|---|---|
| EP | 0710619 A3 | 5/1996 |
| JP | S6216093 A | 1/1987 |
| JP | H0826677 A | 1/1996 |
| JP | H09202551 A | 8/1997 |
| JP | H11201051 A | 7/1999 |
| JP | 2005041636 A | 2/2005 |
| JP | 2005237094 | 9/2005 |
| JP | 2012065463 A | 3/2012 |
| WO | WO 2015/163137 A1 | 10/2015 |

OTHER PUBLICATIONS

Office Action; dated Apr. 16, 2019; Chinese Application No. 201680080456.0; Applicant: Duallift GMBH; Title of Invention: Continuous Cable Winch.

Office Action dated Apr. 9, 2019; Mailing No. 150550; dated Apr. 16, 2019; Japanese Patent Application No. 2018-548274.

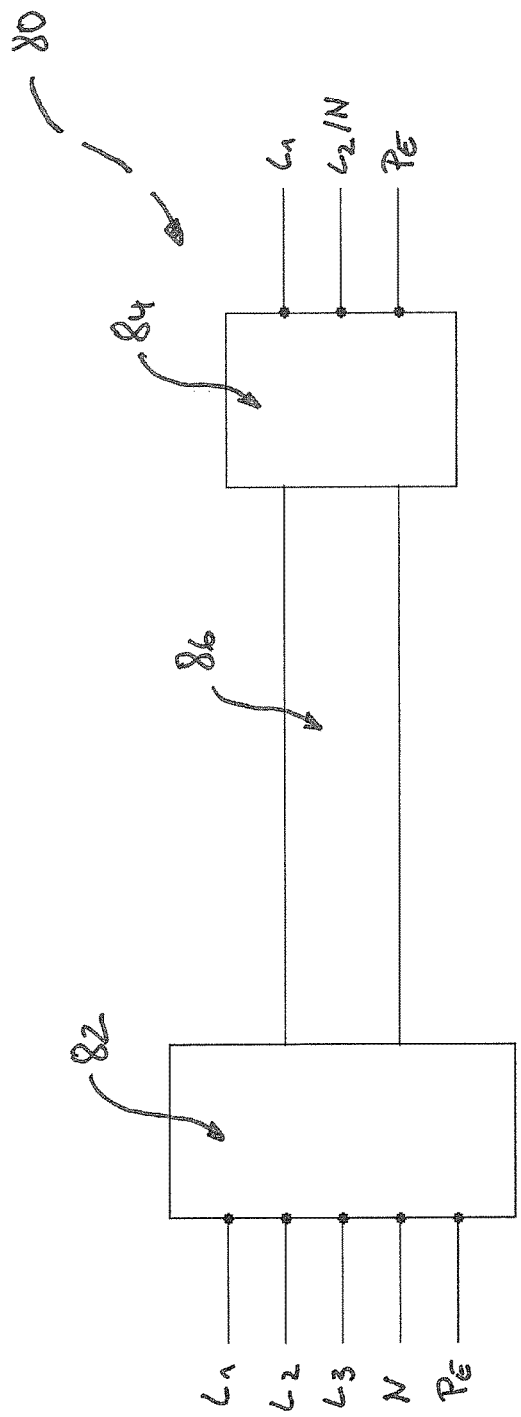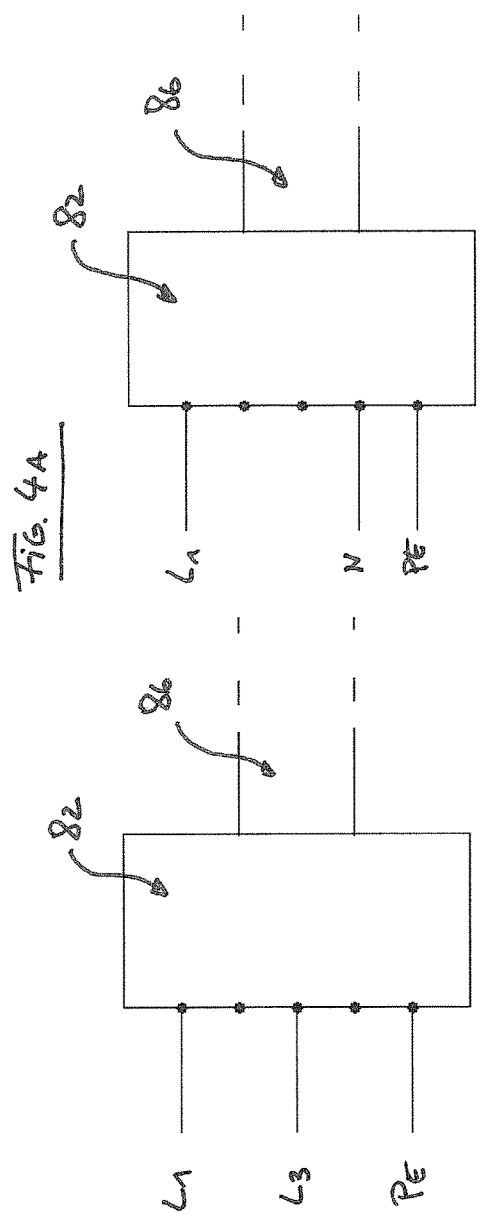
Fig. 4A
Fig. 4B
Fig. 4C

CONTINUOUS CABLE WINCH

RELATED APPLICATION (PRIORITY CLAIM)

This application is a National Phase Under Section 371 of International Application No. PCT/EP2016/063747, filed Jun. 15, 2016.

FIELD OF THE INVENTION

The present invention relates to a continuous cable winch comprising a drive unit and an output unit for applying a drive force to a cable, which output unit is coupled to the drive unit.

BACKGROUND OF THE INVENTION

Winches in general have been known for a long time and are used to lift loads or people, in particular to bridge vertical differences, in all areas of industry. A specific type of winch is the so-called continuous cable winch in which the cable is guided through the winch instead of rolling on the winch, for example in a drum. The cable can hang down, for example, on one or both sides of the continuous cable winch due to the force of gravity or on account of a load acting on it, so that the continuous cable winch does not need to store that part of the cable which is guided through the continuous cable winch. As a result, continuous cable winches can have, in principle, an unlimited stroke or gage length. Continuous cable winches of this kind can be used, in particular, when an infrastructure for fastening external winches is held ready and/or can be held ready in a lift shaft or on a building.

Continuous cable winches are usually used for transporting people or material, for example in window-cleaning gondolas.

By way of example, AC motors which can be connected to a power supply system by means of a plug-in connector are used as drives in continuous cable winches.

These superstructures of continuous cable winches usually have the disadvantage that voltage dips in the power supply system have a direct effect on the drive unit and the continuous cable winch can accordingly drop to an unstable operating point. This operating behavior leads, in particular, to continuous cable winches being used only to a limited extent in countries with a poor electricity supply.

Against this background, the present invention was based on the object of providing a continuous cable winch which mitigates the above-described disadvantages as far as possible, and in particular of enabling a continuous cable winch to be used in countries with a poor electricity supply.

The invention solves the problem on which it is based by way of a continuous cable winch of the kind outlined in the introductory part which has the features as claimed in claim 1.

SUMMARY OF THE INVENTION

According to said claim, a continuous cable winch comprising a drive unit and an output unit for applying a drive force to a cable, which output unit is coupled to the drive unit, is proposed, wherein the drive unit has: a frequency converter with a primary side for drawing current from a power supply system and with a secondary side for outputting an AC voltage, an AC motor for driving the continuous cable winch at a variable rotation speed, which AC motor is supplied with the AC voltage by the frequency converter, and a control unit which is interconnected with the frequency converter and the AC motor for the purpose of controlling the drive unit, wherein the control unit is designed to change the rotation speed of the AC motor by means of the frequency converter. In particular, it is provided according to the invention that the continuous cable winch has a control unit and a frequency converter which are designed to change the rotation speed of the AC motor by means of the frequency converter.

In the process, the invention makes use of the knowledge that lifting devices and tensioning means have a substantially constant load during operation and accordingly the drive power is substantially a function of the rotation speed. In particular, the invention makes use of the fact that, in lifting devices, only the load to be lifted determines the lifting force to be applied and accordingly the speed, that is to say the rotation speed of the AC motor, is reduced in the event of a dip in the supply voltage, that is to say in the event of a dip in the supply system voltage, in order to counteract the effect of the voltage dip.

The control unit preferably has means for voltage detection and is designed to change, in particular to reduce, the rotation speed of the AC motor when an undervoltage is detected. The control unit therefore has at least one apparatus for detecting a voltage, in particular a voltmeter, which is designed to detect voltages, preferably on the primary side of the frequency converter, and to pass on said voltages to the control unit. The control unit itself is further designed to compare the voltages detected in this way with preprogrammed voltage limit values and, in the event of a lower limit value, a so-called undervoltage, being undershot, to adjust the rotation speed of the AC motor such that the mechanical power of the AC motor corresponds to the electrical power provided by the power supply system. The control unit is therefore prepared to throttle the AC motor, in particular to reduce the rotation speed of the AC motor.

According to a preferred embodiment of the invention, the control unit of the continuous cable winch has means for current detection, wherein the control unit is designed to change, in particular to reduce, the rotation speed of the AC motor when an overcurrent is detected. The means for current detection are preferably in the form of overcurrent protection, which means are designed to detect a rated current on the secondary side of the frequency converter and to transfer the rated current detected in this way to the control unit. The control unit further has preprogrammed current limit values and is designed to compare the currents detected in this way with the preprogrammed current limit values and, in the event of an upper limit value, a so-called overcurrent, being exceeded, to adjust the rotation speed of the AC motor such that the mechanical power of the AC motor corresponds to the electrical power provided by the power supply system or to protect the AC motor from a critical operating current.

The currents and voltages can be detected both in a single-phase manner and also in a multiple-phase manner.

The control unit of the continuous cable winch is optionally designed to change the rotation speed of the AC motor in stages, preferably between four, particularly preferably between two stages. To this end, the control unit has, for example, a switching device which is designed to change the excitation voltage of the AC motor in stages, in particular such that the AC motor can also change its sense of rotation. The AC motor can preferably be operated at least at a first and a second speed in a forward rotation direction and also at least one first backward rotation direction. Therefore, the stages can preferably be selected depending on rotation direction and speed.

According to a further preferred embodiment of the invention, the control unit has a control database, wherein the control database is designed to provide preprogrammed control values to the control unit, in particular depending on detected voltages. The control database of the control unit is preferably designed for the purpose that control values are stored, in accordance with the site of use or the corresponding power supply system, such that the continuous cable winch can operate from extremely different power supply systems. An embodiment of this kind can particularly advantageously be used in the field of mass production since the continuous cable winches can be produced independently of the site of use and can be programmed on site in accordance with the site of use.

When an undervoltage is detected by the means for voltage detection and/or an overcurrent is detected by the means for current detection, the control unit of the continuous cable winch is further preferably designed to change the rotation speed of the AC motor depending on the detected undervoltage and/or the detected overcurrent such that the electrical power requirement of the AC motor drops by the same amount as the AC voltage, which is provided by the power supply system, across the frequency converter. To this end, the control unit compares, for example, the detected current or the detected voltage with preprogrammed setpoint values and, in the event of a deviation, the motor is switched over to a corresponding stage such that electrical and mechanical torque are of substantially equal magnitude. This prevents, in particular, passage of the continuous cable winch and/or overcurrents in the AC motor.

According to a further preferred embodiment of the invention, the control unit of the continuous cable winch is designed to halve and to double the electrical power requirement of the AC motor. Therefore, the AC motor is preferably actuated in stages which are multiples of one another. It is particularly advantageous here that this can be realized in a simple manner, for example, by resistance bridge circuits or simple switching processes, so that excessively complex actuation is avoided, as would be the case, for example, in the event of continuous actuation of an AC motor.

According to a further preferred embodiment of the invention, the frequency converter of the continuous cable winch is designed to be operated from a power supply system with a number of phases, preferably in the range of from one phase to three phases. To this end, the AC motor is, for example, in the form of a 1-phase or 3-phase motor, so that it can be operated both from a single-phase and also from a three-phase power supply system.

According to a particularly preferred embodiment, the frequency converter and the control unit of the continuous cable winch are in the form of an integrated apparatus. A particular advantage of an integrated, in particular integral, design is the resulting modular construction which allows simple retrofitting to existing AC motors of continuous cable winches.

According to a particularly preferred embodiment of the invention, the power supply system to which the continuous cable winch is connected has a rated voltage of at least 50 V, preferably at least 100 V, further preferably at least 200 V, particularly preferably at least 230 V. The continuous cable winch is accordingly designed to also be operated from a power supply system with a low voltage, such as 50 V for example. The continuous cable winch is preferably operated from power supply systems with a rated voltage of 200 V to 400 V.

According to a further preferred embodiment of the invention, the AC motor of the continuous cable winch is designed for operation with a single-phase rated AC voltage of 230 V. The AC motor is accordingly in the form of a 1-phase 230 V AC motor. The high replacement part density and the simple servicing of AC motors of this kind are particularly advantageous here. This is particularly important in countries with a poor infrastructure which usually also provide a significantly unstable power supply system.

According to a further preferred embodiment of the invention, the frequency converter of the continuous cable winch is designed for operation from a three-phase power supply system with at least 400 V. The continuous cable winch is therefore also designed to be used in Europe.

According to a further preferred embodiment of the invention, the control voltage of the rectifier is 24 V, preferably 230 V. The continuous cable winch is accordingly switched with a control voltage of 24 V or 230 V. However, other control potentials would also be feasible.

According to a further preferred embodiment of the invention, the continuous cable winch has an adapter with a supply system-side primary side and a secondary side for connection to the continuous cable winch, wherein the adapter is designed to provide at least one single-phase rated AC voltage of 230 V on the secondary side. By way of example, an adapter which is designed to electrically couple the continuous cable winch to a power supply system be used for connecting the continuous cable winch to the power supply system. The adapter preferably provides a single-phase AC voltage of 230 V to the frequency converter. It is particularly advantageous here that the continuous cable winch can be designed, at low cost, to operate from power supply systems of which the voltage levels, plug-in connectors or supply system superstructures are not compatible for connection of the continuous cable winch. A few examples of adapters of this kind will be explained further below.

BRIEF DESCRIPTION OF THE DRAWINGS

The invention will be described in more detail below on the basis of preferred exemplary embodiments and with reference to the appended figures, in which:

FIG. 4a shows a schematic illustration of adapters of a continuous cable winch according to one embodiment FIG. 4b shows a schematic illustration of a further embodiment of a primary side of an adapter according to FIG. 4a FIG. 4c shows a schematic illustration of a further preferred embodiment of a primary side of an adapter according to FIG. 4a The same reference symbols are provided for identical or similar elements with respect to the exemplary embodiments. In this respect, where a figure is not explicitly cited, reference is respectively made to the explanations relating to the other figures.

DETAILED DESCRIPTION

Figure 1:
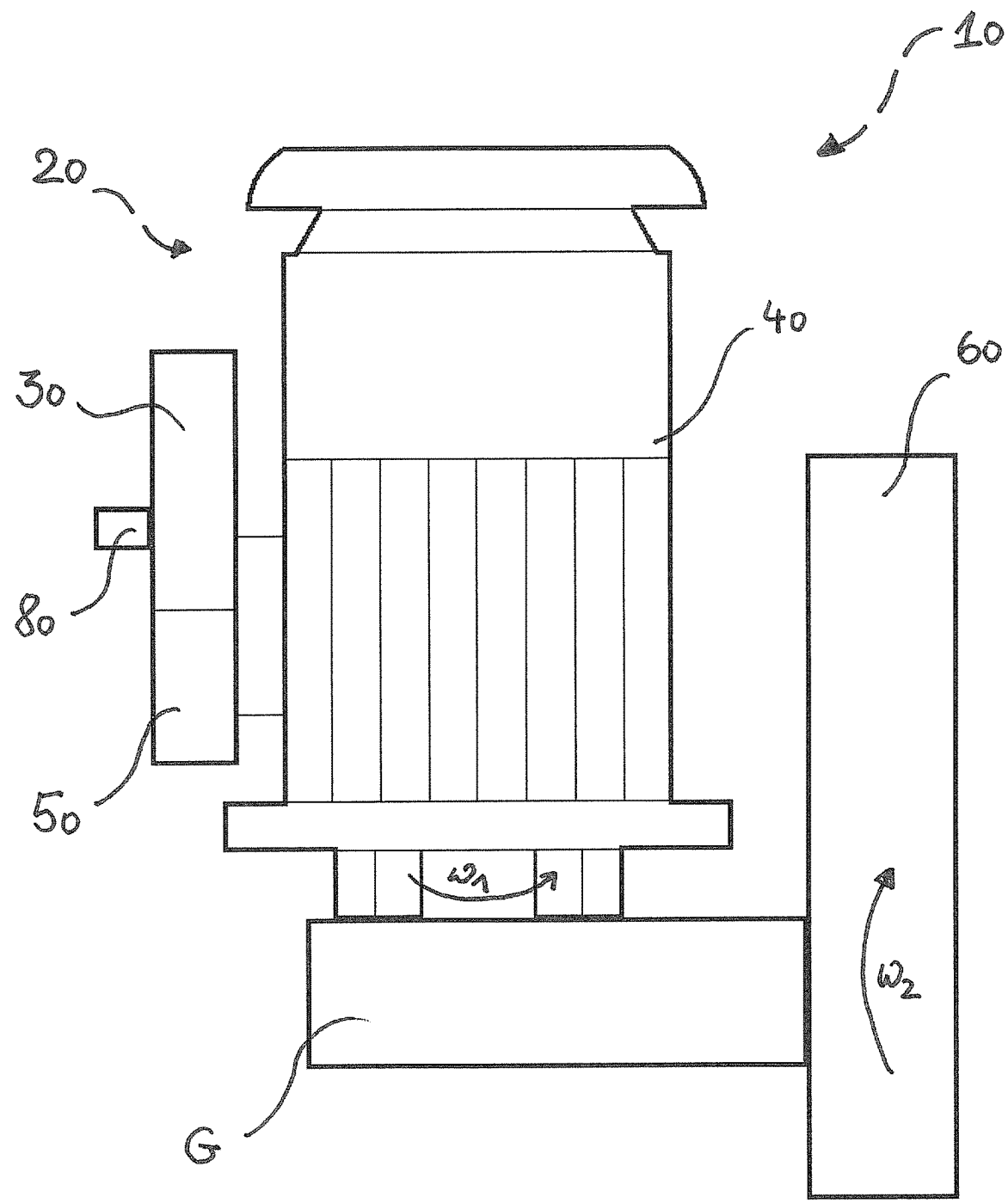
FIG. 1 shows a schematic side view of a continuous cable winch according to one embodiment

FIG. 1 shows a continuous cable winch comprising a drive unit 20, wherein the drive unit 20 comprises a frequency converter 30 with a primary side for drawing current from a power supply system and with a secondary side for outputting an AC voltage, an AC motor 40 for driving the continuous cable winch 10 at a variable rotation speed ω1, which AC motor is supplied with the AC voltage by the frequency converter 30, a control unit 50 which is interconnected with the frequency converter 30 and the AC motor 40 for the purpose of controlling the drive unit 20, and an output unit 60 with a second rotation speed ω2 for applying a drive force to a cable (not illustrated), which output unit is coupled to the drive unit 20.

The output unit 60 with a variable rotation speed $\omega_2$ is coupled to the drive unit 20 by means of a connecting device G, for example by means of a transmission, so that these rotation speeds have a transmission ratio. In a further embodiment, the output unit 60 and the drive unit 20 are connected by means of a common flange or have a common shaft. In these cases, the transmission ratio is essentially 1 and the rotation speed $\omega_1$ of the drive unit 20 corresponds to the rotation speed $\omega_2$ of the output unit 60.

In order to supply power to the continuous cable winch, the drive unit 20 is coupled to the electrical power supply system by means of a connection device 80, which is in the form of an adapter 80 for example, such that the continuous cable winch 10 is energized so as to be operational. The frequency converter 30 and the control unit 50 are of two-part form here.

Figure 2:
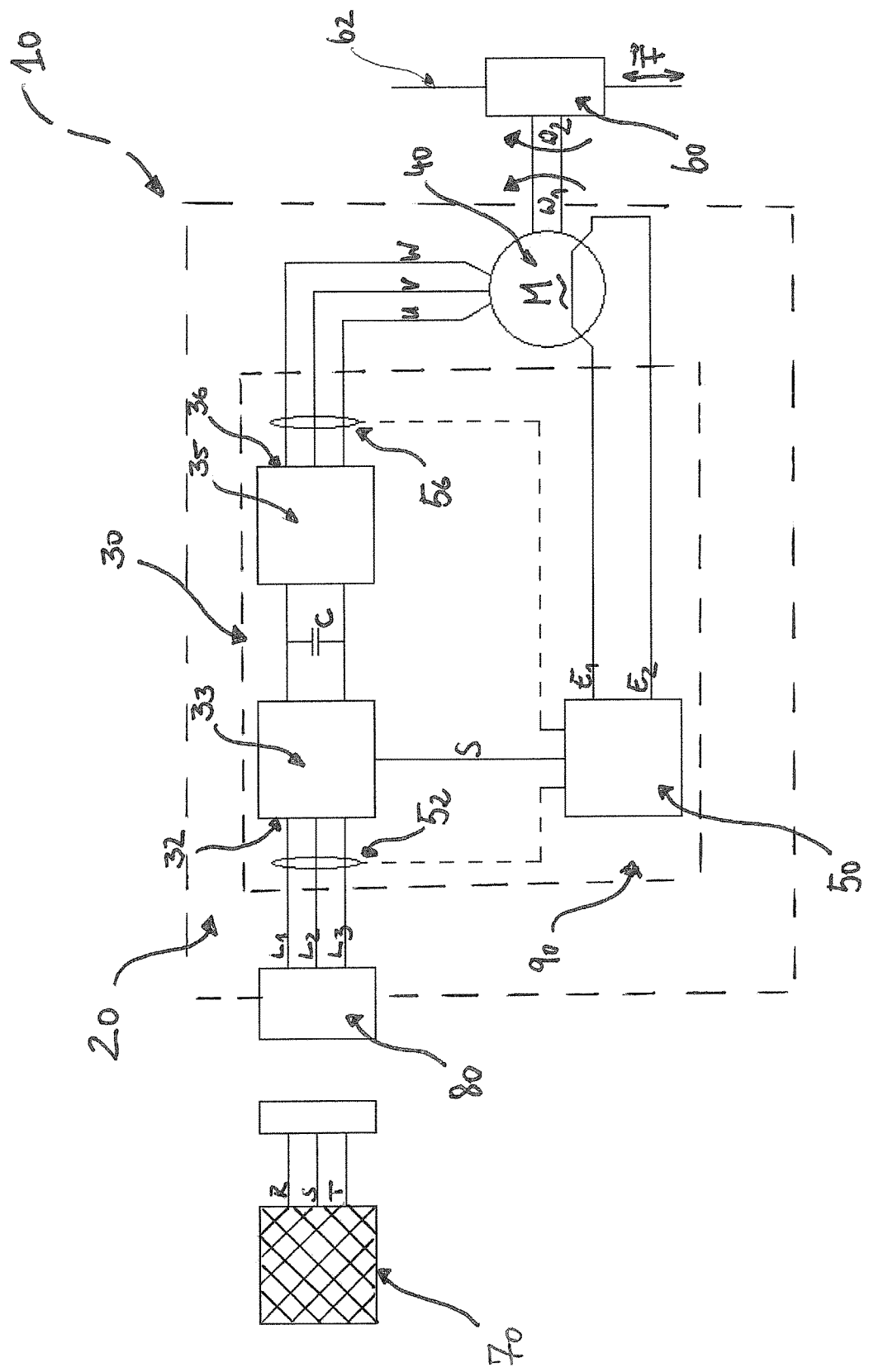
FIG. 2 shows a schematic interconnection arrangement of a continuous cable winch according to one embodiment

FIG. 2 shows an interconnection arrangement of a continuous cable winch 10 according to one embodiment. The drive unit 20 has a frequency converter 30 comprising a DC voltage intermediate circuit C, wherein the primary side of the frequency converter 32 has the three phases L1, L2, L3 for drawing power, which three phases are accordingly connected to the three phases R, S, T of the power supply system 70 in the correct phase such that the rated voltage of the electrical power supply system 70, preferably 230 V, is provided to the frequency converter 30 on the primary side 32. The frequency converter 30 is therefore designed for operation from a conventional three-phase power supply system 70. The primary side 32 or the frequency converter 30 is further designed to be operated with an at least 400 V input voltage.

The frequency converter 30 has, on the primary side, a rectifying apparatus 33 and, on the secondary side, an inverting apparatus 35, wherein these apparatuses are coupled to one another by means of a DC voltage intermediate circuit such that the frequency converter, on its secondary side 36, provides a preferably three-phase AC voltage $U_U$, $U_V$, $U_W$ which, by means of the phases U, V, W, to the AC motor 40 such that said AC motor can drive the output unit 60 in order to apply the drive force F to a cable 62 which runs through the continuous cable winch 10.

Furthermore, the drive unit 20 of the continuous cable winch 10 has a control unit 50 which is connected to the frequency converter 30 and to the AC motor 40 by means of lines S, E1, E2, wherein control signals are passed to the frequency converter 30 by means of a line S and the AC motor 40 is excited by means of a line which is formed from a forward conductor E1 and a return conductor E2.

In a particularly preferred embodiment, the frequency converter 30 and the control unit are of substantially integral form, that is to say in the form of one apparatus 90 which is connected to the electrical power supply system 70 by means of an adapter 80. To this end, the adapter 80 has a supply system-side primary side and a secondary side for connection to the continuous cable winch 10, in particular for connection to the frequency converter 30 and/or the control unit 50. The adapter is further designed to provide at least one single-phase rated AC voltage of 230 V on the secondary side, and the power supply system 70 has a rated voltage of at least 50 V, preferably at least 100 V, further preferably at least 200 V, particularly preferably at least 230 V.

The control unit 50 additionally has at least one voltage detection arrangement 52 and is designed to change, in particular to reduce, the rotation speed $\omega_1$ of the AC motor when an undervoltage is detected. According to one embodiment, the means for voltage detection 52 are arranged on the primary side 32 of the frequency converter 30 such that the voltage detection arrangement 52 can detect a voltage dip in the supply system voltage of the power supply system 33. The control unit 50 also may comprise a further voltage detection arrangement 52 which detects the motor voltage Uu, Uv, Uw on the secondary side 36 of the frequency converter 30.

Furthermore, the control unit has at least one current detection arrangement 56 and is designed to change, in particular to reduce, the rotation speed $\omega_1$ of the AC motor when an overcurrent is detected. According to one embodiment, the means for current detection 56 are arranged on the secondary side 36 of the frequency converter such that the current detection arrangement 56 can detect an excessively high current in the AC voltage motor. The control unit can also further have further current detection arrangements 56 which detects the power supply system current, which flows in the frequency converter 30, on the primary side 32 of the frequency converter 30.

The control unit 50 is designed to switch the rotation speed $\omega_1$ of the AC motor in stages such that the undervoltage and/or overcurrents detected by the means 62, 66 are taken into account in the power output of the drive unit 20, in particular such that, in the event of a voltage dip, the rotation speed $\omega_1$ of the drive unit and accordingly the rotation speed of the output unit $\omega_2$ are reduced such that the cable 62 running through the continuous cable winch has a lower speed, in particular half the rated speed. In a particularly preferred embodiment, the cable 62 has a rated speed of 18 meters per minute, and the control unit is designed to halve the speed to 9 meters per minute.

The control unit 50 is therefore designed to change the rotation speed $\omega_1$ of the AC motor depending on the detected undervoltage and/or the detected overcurrent such that the electrical power requirement of the AC motor 40 drops by the same amount as the AC voltage $U_R$, $U_S$, $U_T$, which is provided by the power supply system 33, across the frequency converter 30.

Figure 3:
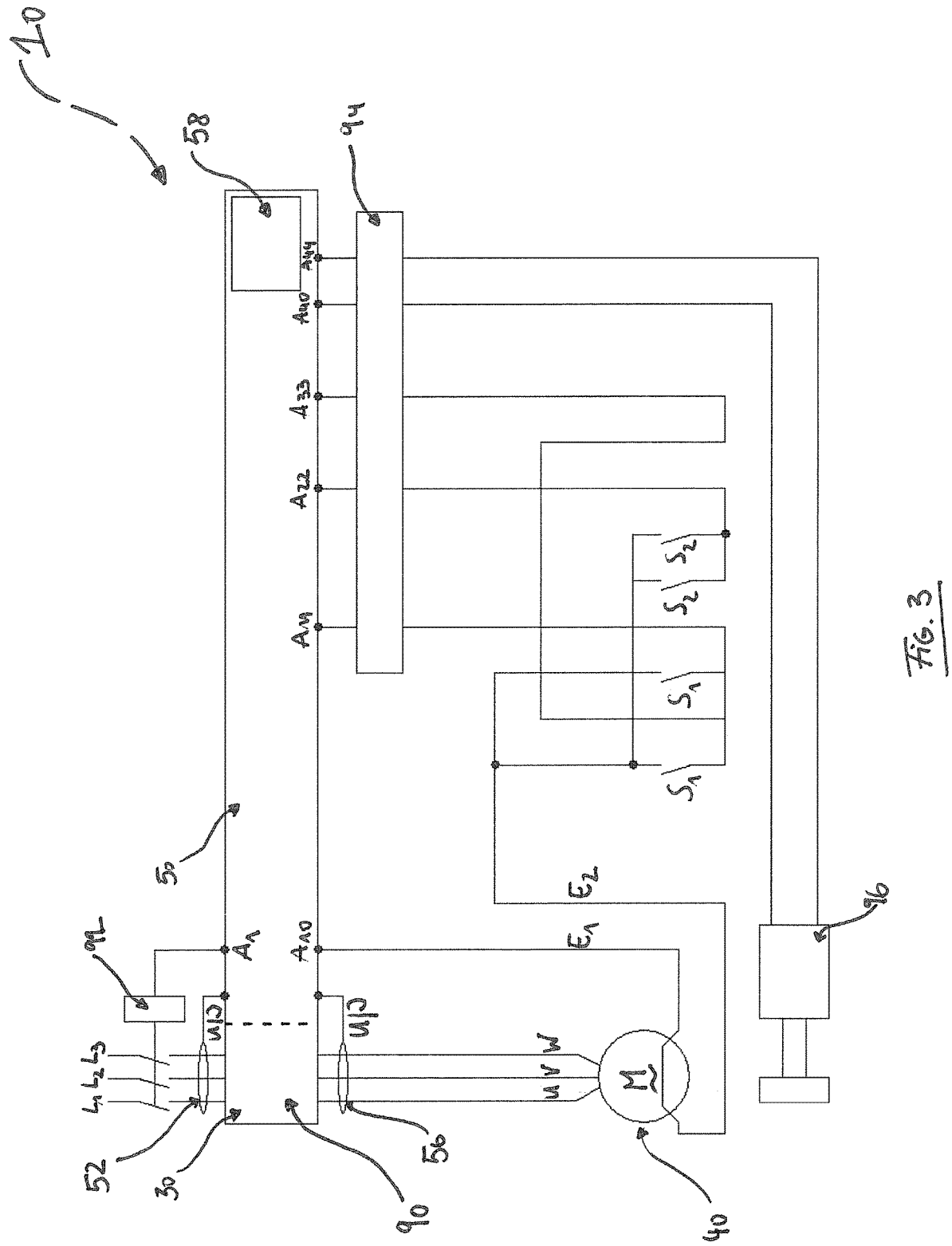
FIG. 3 shows a schematic illustration of a control arrangement of a continuous cable winch according to one embodiment

FIG. 3 shows a preferred control arrangement of a continuous cable winch 10 according to one embodiment, wherein the frequency converter 30 and the control unit 50 are formed in an apparatus 90 with three phases L1, L2, L3 for drawing power. According to FIG. 2, the three phases L1, L2, L3 can be connected to a power supply system (not illustrated). In order to avoid damage to the continuous cable winch 10, for example in the event of overcurrents, the continuous cable winch has an emergency switch 92 which is designed to disconnect the continuous cable winch 10 from the power supply system. In a preferred embodiment, this is performed by means of the control unit 50 which has a control output A1 which is designed to actuate the emergency switch such that the continuous cable winch is disconnected from the power supply system. The continuous cable winch can further also have a pushbutton (not illustrated) for this purpose, which pushbutton can be manually operated by service personnel in the event of a fault in order to avoid damage to the continuous cable winch 10.

The frequency converter 30 has three phases U, V, W by means of which the AC motor 40 of the continuous cable winch is energized. The frequency converter 30 is further designed to be operated from a power supply system with at least one phase. The frequency converter is preferably designed to be operated from a power supply system with three phases.

Furthermore, the control unit 50 has two control outputs A10, A11 which are connected to the forward conductor E1 and the return conductor E2 such that the AC motor 40 is excited with a first excitation voltage such that the AC motor 40 has the rotation speed of a first stage S1, as a result of which the continuous cable winch 10 has a first speed, for example 18 meters per minute. The first stage S1 is selected by the control unit 50 by means of a first switch S1.

In addition, the control unit 50 has a control output A22. In the event of a detected undervoltage and/or an overcurrent, the control unit switches the control inputs A11, A22 such that the AC motor 40 is excited by a second excitation voltage such that the AC motor 40 has the rotation speed of a second stage S2, as a result of which the continuous cable winch has a second speed, for example 9 meters per minute. The second stage S2 is selected by the control unit 50 by means of a second switch S2. Depending on the type of control arrangement, different switching states are created for the switching logic, for example the first switch S1 is closed and the second switch S2 is open for the first stage S1, and the first switch S1 is open and the second switch S2 is closed for the second stage. The control unit 50 is therefore designed to change the rotation speed of the AC motor in stages between two stages S1, S2. The control unit is preferably designed to change the rotation speed of the AC motor such that the electrical power requirement of the AC motor 40 is halved or doubled. The control unit 50 is optionally designed to change the rotation speed of the AC motor $\overline{\omega}_1$ in stages between four stages.

The control unit 50 also has a control database 58 which is designed to provide preprogrammed control values to the control unit 50, in particular depending on the detected voltages and currents. The continuous cable winch is therefore designed to be programmed for specific power supply systems and/or tasks such that it can be adjusted in accordance with the field of use of the continuous cable winch. The control unit optionally has a control voltage of 24 V. In a particularly preferred embodiment, the control voltage is 230 V.

The control unit 50 is therefore designed to change the rotation speed of the AC motor depending on the detected undervoltage and/or the detected overcurrent when an undervoltage is detected by means for voltage detection and/or an overcurrent is detected by means for current detection such that the electrical power requirement of the AC motor 40 drops by the same amount as the AC voltage, which is provided by the supply system, across the frequency converter 30 or the apparatus 90.

Furthermore, the control unit 50 has a control output A33 which is designed to reverse the rotation direction of the AC motor 40. The control output A33 accordingly has a potential which is opposite to the potentials of the control outputs A11, A22 such that the excitation current which flows through the AC motor reverses its direction. In one embodiment, the continuous cable winch 10 has two forward speeds and one reverse speed.

The apparatus 90 also has a protection device 94 which is designed to detect a faulty excitation current of the AC motor. This can be performed, for example, by the means for current detection of the control unit. In the event of a faulty excitation current, the protection device is tripped and interrupts the excitation of the AC motor.

Furthermore, the apparatus 90 has an electrical brake 96 which can be actuated by means of the control outputs A40, A42, wherein the electrical brake 96 is designed to brake the AC motor 40 and accordingly the continuous cable winch 10.

FIG. 4a shows a schematic illustration of an adapter 80 of a continuous cable winch 10 according to one embodiment.

Adapter 80 has a supply system-side primary side 82 and a secondary side 84 for connection to the continuous cable winch, which primary side and secondary side are coupled to one another by means of a connecting element 86. The supply system-side primary side 82 has the connections L1, L2, L3, N, PE, so that the adapter 80 is designed to be connected to any desired power supply systems, for example by means of plugs. The secondary side 84 has the connections L1, L2/N, PE, so that the secondary side is designed to be coupled to an AC motor 40 according to one embodiment. Furthermore, the adapter is designed to provide at least one single-phase rated AC voltage of 230 V on the secondary side.

FIG. 4b shows a schematic illustration of a further embodiment of a primary-side adapter according to FIG. 4a. The primary side 82 has the connections L1, L3, PE, so that the adapter is designed to be connected to a supply system connection which is equivalent thereto.

FIG. 4c shows a schematic illustration of a further preferred embodiment of an adapter according to FIG. 4a. The primary side 82 has the connections L1, N, PE, so that the adapter is designed to be connected to a supply system connection which is equivalent thereto.

What is claimed is:

1. A continuous cable winch comprising a drive unit and an output unit for applying a drive force to a cable, which output unit is coupled to the drive unit, wherein the drive unit has:
    a frequency converter with a primary side for drawing current from a power supply system and with a secondary side for outputting an AC voltage (Uu, Uv, Uw),
    an AC motor for driving the continuous cable winch at a variable rotation speed (ol) which AC motor is supplied with the AC voltage (Uu, Uv, Uw) by the frequency converter,
    a control unit which is interconnected with the frequency converter and the AC motor for the purpose of controlling the drive unit, wherein
    the control unit has a control database set up to provide preprogrammed control values to the control unit, and wherein
    the control unit is designed to determine a variation in current or voltage from the power supply system causing an unstable operating point, and in response, change the rotational speed (ol) of the AC motor to a preprogrammed control value by means of the frequency converter to counteract the variation
    wherein the variation is determined by comparing the current or voltage with the preprogrammed control values which comprise preprogrammed current limit values and preprogrammed voltage limit values in accordance with site of use or the power supply system.

2. The continuous cable winch as claimed in claim 1, wherein
    the control unit has means for voltage detection and is designed to reduce the rotational speed (ol) of the AC motor when an undervoltage is detected.

3. The continuous cable winch as claimed in claim 1, wherein
the control unit has means for current detection and is designed to reduce the rotational speed (ol) of the AC motor when an overcurrent is detected.

4. The continuous cable winch as claimed in claim 1, wherein the control unit is designed to change the rotation speed (ol) of the AC motor in two or more stages.

5. The continuous cable winch as claimed in claim 1, wherein
the control database is designed to provide pre-programmed control values to the control unit based on detected voltages and currents.

6. The continuous cable winch as claimed in claim 1, wherein
when at least one of an undervoltage is detected by a means for voltage detection and an overcurrent is detected by a means for current detection, the control unit is designed to change the rotation speed (ol) of the AC motor depending on the detected undervoltage and/or the detected overcurrent such that the electrical power requirement of the AC motor drops by the same amount as the AC voltage (UR, Us, UT), which is provided by the power supply system across the frequency converter.

7. The continuous cable winch as claimed in claim 6, wherein
the power supply system has a rated voltage of at least 50 V, at least 100 V, at least 200 V, or at least 230 V.

8. The continuous cable winch as claimed in claim 1, wherein the control unit is designed to halve and to double the electrical power requirement of the AC motor.

9. The continuous cable winch as claimed in claim 1, wherein
the frequency converter is designed to be operated from a power supply system with one or more phases.

10. The continuous cable winch as claimed in claim 1, wherein
the frequency converter and the control unit are in the form of an integrated apparatus.

11. The continuous cable winch as claimed in claim 1, wherein
the AC motor is designed for operation with a single-phase rated AC voltage of 230 V.

12. The continuous cable winch as claimed in claim 1, wherein the frequency converter is designed for operation from a three-phase power supply system with at least 400 V.

13. The continuous cable winch as claimed in claim 1, wherein
a control voltage of the rectifier is 24 V or 230 V.

14. The continuous cable winch as claimed in claim 1, wherein
the continuous cable winch has an adapter with a supply system-side primary side and a secondary side for connection to the continuous cable winch, and
the adapter is designed to provide at least one single-phase nominal rated AC voltage of 230 V on the secondary side.

* * * * *